United States Patent Office 3,573,285
Patented Mar. 30, 1971

3,573,285
N-(3 - ALKOXYESTRA - 1,3,5(10) - TRIEN-17β-YLAMINO)-TERTIARY AMINES AND INTERMEDIATES THERETO
Paul D. Klimstra, Northbrook, Ill., assignor to G. D. Searle & Co., Chicago, Ill.
No Drawing. Filed Sept. 6, 1968, Ser. No. 758,106
Int. Cl. C07c 173/00
U.S. Cl. 260—239.55                 9 Claims

ABSTRACT OF THE DISCLOSURE

N-(3-alkoxyestra-1,3,5(10)-trien - 17β-ylamino)-tertiary amines preparable by reaction of a 3-alkoxyestra-1,3,5(10)-trien-17-one with an N-amino-tertiary amine followed by reduction of the resulting imine are useful in view of their valuable pharmacological properties, i.e. estrogenic and anti-microbial, e.g. anti-protozoal, anti-algal and anti-fungal.

---

The present invention is concerned with novel chemical compounds characterized by a hydrazino substiuent at the 17-position and, more particularly, with N-(3-alkoxyestra-1,3,5(10)-trien-17β-ylamino)-tertiary amines represented by the following structural formula

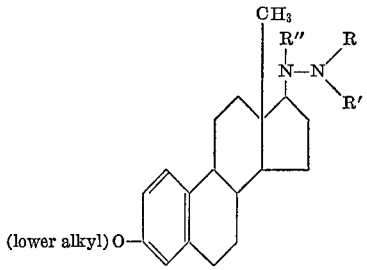

wherein NRR′ denotes the residue of an aliphatic or heterocycloaliphatic secondary amine and R″ is either hydrogen or a formyl radical.

Examples of aliphatic secondary amine residues denoted by NRR′ in the foregoing structural representation are dimethylamino, diethylamino, dipropylamino and dibutylamino. Typical of the heterocycloaliphatic secondary amine residues are morpholino, pyrrolidino and piperidino.

The compounds of this invention are conveniently manufactured by utilizing a starting materials 3-alkoxyestra-1,3,5(10)-trien-17-ones as represented by the following structural formula

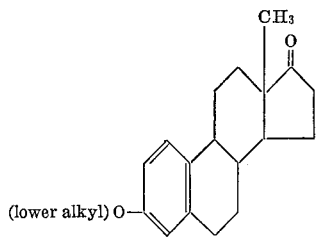

Condensation of those starting materials with the appropriate N-amino-tertiary amine affords the corresponding imine, which is then contacted with a suitable reducing agent. A specific example of those processes is the reaction of 3-methoxyestra-1,3,5(10-trion-17-one with N,N-dimethylhydrazine and reaction of the resulting hydrazone with sodium borohydride to afford N′-(3-methoxyestra-1,3,5(10)-trien-17β - ylamino)-N,N-dimethylamine.

The N′-formyl compounds of the present invention are obtained by acylation with formic acid in the presence of a suitable catalyst such as acetic anhydride. N′-(3-Methoxyestra-1,3,5(10)-trien - 17β - ylamino)-N,N-dimethylamine is thus heated with formic acid and acetic anhydride to yield N′-formyl-N′-(3-methoxyestra-1,3,5 (10)-trien-17β-ylamino)-N,N-dimethylamine.

Equivalent to the organic bases of this invention are the corresponding pharmaceutically acceptable non-toxic acid addition and quaternary salts as exemplified by the citrate, oxalate, tartrate, maleate, ascorbate, gluconate, lactate, succinate, phosphate, sulfate, hydrobromide, hydrochloride, methiodide, ethiodide, methochloride, methobromide, methosulfate and ethosulfate.

The compounds of this invention are useful as a result of their valuable pharmacological properties. They are, for example, estrogenic and anti-microbial, e.g. anti-protozoal, anti-algal and anti-fungal, agents.

The estrogenic property of these compounds is specifically illustrated by the activity of 4-(3-methoxyestra-1,3,5(10)-trien-17β - ylamino)morpholine, N′-(3-methoxyestra-1,3,5(10)-trien-17β-ylamino) - N,N-dimethylamine oxalate, N′-formyl-N′-(3-methoxyestra - 1,3,5(10)-trien-17β-ylamino)-N,N-dimethylamine and N′-(3-methoxyestra-1,3,5(10)-trien-17β - ylamino) - N,N-dimethylamine when tested in the following assay:

To a group of 6–10 white, 21-day old female mice is administered intragastrically once daily for a period of 3 days a corn oil solution or suspension contaning ⅓ the selected dose of the test compound. An initial total dose of 1 mg. is normally employed. Twenty-four hours following the final treatment the animals are sacrificed and the uteri are removed, dissected free of extraneous tissue, blotted to express contained fluid and weighed. Those uterine weights are compared with the correspeonding weights from control animals treated with corn oil alone. A compound is designed active if the mean uterine weight of the treated animals is significantly (P≦0.01) greater than the mean uterine weight of the control animals. Potency is expressed as the percentage of activity of the standard, i.e. subcutaneously administered estrone and is calculated by determining the dose of the test compound and the dose of estrone which produces an identical increase in mean uterine weight.

The anti-fungal property of the compounds of this invention is specifically illustrated by the activity of 4-(3-ylamine methoxyestra-1,3,5(10) - trien-17β-ylamino)morpholine, N′-(3-methoxyestra-1,3,5(10) - trien - 17β-ylamino)-N,N-dimethylamine oxalate and N′-(3-methoxyestra-1,3,5(10)-trien-17β - ylamino)-N,N-dimethylamine when tested in the following assay:

The test compound is dissolved or suspended in melted Sabouraud agar and is held at 80° C. for 20 minutes. Dilutions are made from this preparation in melted Sabouraud agar in order to give concentrations of the test substance of 1000, 100, 10 and 1 mcg./ml. in the agar. The agar is permitted to cool and solidify and is then surface inoculated with a suspension of spores of *Trichophyton mentagrophytes, Trichophyton rubrum, Microsporum audouini, Microsporum nanum, Verticillium albo atrum, Ceratocystis ulmi* or *Candida albicans*. The inoculated media are incubated at room temperature, those containing *Candida albicans* for about 48 hours and the remaining media for 6–7 days, when are examined grossly for the presence or absence of growth of the test organism. Control preparations lacking the test compound are employed for comparative purposes. The activity of the compound is reported as mcg. of the compound/ml. of agar which completely prevents visible growth of the test organism.

The anti-algal property of the instant compounds is specifically illustrated by the activity of N′-(3-methoxyestra - 1,3,5(10) - trien - 17β - ylamino) - N,N - dimethylamine and N' - (3 - methoxyestra - 1,3,5(10) - trien-17β-ylamino)-N,N-dimethylamine oxalate when tested in the following assay:

Sterile Bristol agar is inoculated with an aqueous suspension of the alga *Chlorella vulgaris,* whereupon 5 mg. of the test compound is placed on the inoculated agar surface. The inoculated agar is incubated at room temperature under artificial light for 7 days, at the end of which time it is examined for microbial growth. Activity is indicated by a clear zone of inhibition of growth surrounding the test compound.

The anti-protozoal property of the instant compounds is specifically illustrated by the activity of N'-(3-methoxyestra - 1,3,5(10) - trien - 17β - ylamino) - N,N - dimethylamine and N' - (3 - methoxyestra - 1,3,5(10) - trien-17β-ylamino) - N,N - dimethylamine oxalate when tested in the following assay:

To 80 volumes of a modified Diamond medium prepared by mixing 1200 parts of trypticase (Baltimore Biological Laboratories), 600 parts of yeast extract (Disco), 300 parts of maltose, 60 parts of L-cysteine hydrochloride, 12 parts of L-ascorbic acid, 48 parts of dibasic potassium phosphate, 48 parts of monobasic potassium phosphate, and 54,000 parts of distilled water, adjusting the pH to 6.8 with 4% aqueous sodium hydroxide, incorporating 30 parts of agar (Baltimore Biological Laboratories), boiling for 1 minute to dissolve the agar, and sterilizing in an autoclave, is added aseptically 20 volumes of sterile Dubos medium serum. The resulting medium is inoculated with 1% by volume of a 72 hour culture of *Trichomonas vaginalis,* whereupon 1 ml. of the inoculated medium is mixed with 10 mg. of test compound. The mixture is incubated anaerobically at 37° for 48 hours, then is examined microscopically for the presence of motile Trichmomonads. If any are observed, the compound is considered inactive. If no motile Trichomonads are observed, 0.1 ml. of the incubated mixture is serially diluted and mixed with additional quantities of the inoculated medium sufficient to produce concentrations of 1000, 100, 10 and 1 mcg. of test compound per ml. and the resulting mixtures are inoculated anaerobically as before at 37° C. for 48 hours, then are examined microscopically for the presence of motile Trichomonads. Controls are provided by concurrent incubations identical with the foregoing except for the absence of the test compound.

The invention will appear more fully from the examples which follow. These examples are set forth by way of illustration only and it will be understood that the invention is not to be construed as limited thereby either in spirit or in scope as many modifications both in materials and methods will be apparent from this disclosure to those skilled in the art. In these examples temperatures are given in degrees centigrade (° C.). Quantities of materials are expressed in parts by weight unless otherwise noted.

EXAMPLE 1

A mixture containing 15 parts of 3-methoxyestra-1,3,5(10)-trien-17-one, 12 parts of N,N-dimethylhydrazine, 200 parts of ethanol and 1 part of glacial acetic acid is heated at the reflux temperature for about 4 hours, at the end of which time the mixture becomes homogeneous. Heating at the reflux temperature is continued for about 16 hours and the mixture is then diluted with water. Extraction of the resulting aqueous mixture with ether affords an organic solution, which is washed with water, dried over anhydrous sodium sulfate containing decolorizing carbon and stirpped of solvent under reduced pressure. The oily residue thus obtained solidifies upon standing and is dissolved in ethyl acetate. To that organic solution is added a solution of oxalic acid in ethyl acetate and the resulting precipitate is collected by filtration, then purified by recrystallization from methanol-ethyl acetate to afford 3-methoxyestra-1,3,5(10)-trien-17-one N,N-dimethylhydrazone, characterized by an optical rotation, in ethanol, of +61.5°.

EXAMPLE 2

A mixture containing 15 parts of 3-methoxyestra-1,3,5(10)-trien-17-one, 12 parts of 4-aminomorpholine and 200 parts of ethanol is heated at the reflux temperature for about 24 hours, at the end of which time one part of glacial acetic acid is added and refluxing is continued for 24 hours longer. That reaction mixture is diluted with water, then cooled at 0-5° in order to promote crystallization. The crude product which separates is collected by filtration and purified by recrystallization from methanol to afford 4-(3-methoxyestra-1,3,5(10)-trien-17-imino)morpholine, which exhibits an optical rotation, in chloroform, of +168°. This compound is represented by following structural formula

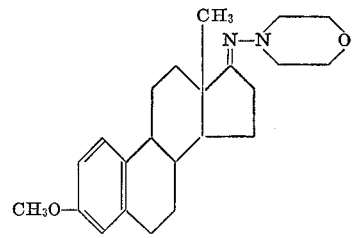

EXAMPLE 3

To a solution of 13 parts of 3-methoxyestra-1,3,5(10)-trien-17-one N,N-dimethylhydrazone in 336 parts of methanol is added portionwise 60 parts of solid sodium borohydride over a period of about 1 hour. The reaction becomes exothermic and the reflux which ensues is allowed to continue for about 1 hour. At the end of that time the mixture is diluted with water, then is cooled and extracted with ether. That ether solution is washed with water, dried over anhydrous sodium sulfate containing decolorizing carbon and stripped of solvent by distillation under reduced pressure. The remaining oily residue is extracted into ethyl acetate and that solution is mixed with an ethyl acetate solution of oxalic acid. The resulting precipitate is collected by filtration and recrystallized from methanol-ethyl acetate to afford N'-(3methoxyestra-1,3,5(10)-trien-17-ylamino)-N,N-dimethylamine oxalate characterized by an optical rotation, in ethanol, of +52°.

The latter oxalate salt is dissolved in aqueous methanol and that solution is made alkaline by the addition of aqueous sodium hydroxide. The oily solid which separates solidifies upon standing and is recrystallized from aqueous acetone to afford N'-(3-methoxyestra-1,3,5(10)-trien-17-ylamino)-N,N-dimethylamine, characterized by an optical rotation, in chloroform, of +55°. This compound is represented by the following structural formula

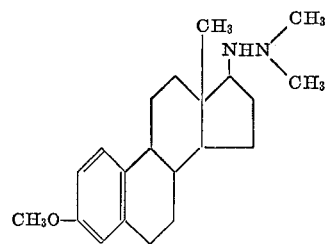

EXAMPLE 4

A mixture containing 24.4 parts of formic acid and 20 parts of acetic anhydride is cooled, then is added to 2.4 parts of N'-(3-methoxyestra-1,3,5(10)-trien-17-ylamino)-N,N-dimethylamine. The resulting reaction mixture is heated on a steam bath for about 3 hours, then is cooled and diluted with approximately 20 parts of methanol. Water is then added to the point of turbidity and the resulting mixture is cooled at 0-5° in order to promote crystallization. The resulting needle-like crystals are collected by filtration and dried to afford N'-formyl-N'-(3-methoxyestra - 1,3,5(10) - trien-17-ylamino)-N,N-dimethylamine. This compound is represented by the following structural formula

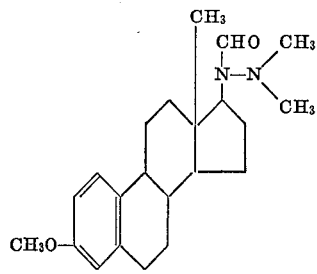

EXAMPLE 5

To a solution of 8 parts of 4-(3-methoxyestra-1,3,5(10)-trien-17-imino)morpholine in 120 parts of methanol is added portionwise, over a period of about 45 minutes, 40 parts of sodium borohydride. An additional 104 parts of methanol is then added and heating at the reflux temperature with stirring is continued for about 30 minutes longer. At the end of that time the mixture is cooled and diluted with water. The precipitate which forms is collected by filtration, washed on the filter with water, then recrystallized from methanol to yield platelet-like crystals of 4 - (3 - methoxyestra-1,3,5(10)-trien-17β-ylamino)morpholine, characterized by an optical rotation of +17.5° in chloroform. This compound is represented by the following structural formula

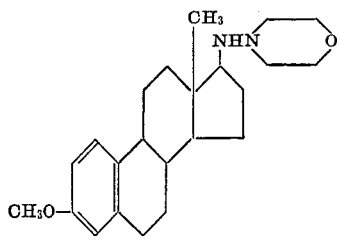

EXAMPLE 6

A cooled mixture of 18.3 parts of formic acid and 15 parts of acetic anhydride is added to 2 parts of 4-(3-methoxyestra - 1,3,5(10) - trien - 17β - ylamino)morpholine and the resulting reaction mixture is heated on the steam bath for about 16 hours. At the end of that time the mixture is diluted with water and the resulting needle-like crystals are collected by filtration, washed with water, then recrystallized from methanol to afford needle-like crystals of 4 - (N' - formyl - 3 - methoxyestra-1,3,5(10) - trien - 17β - ylamino)morpholine, melting at about 181–183° and characterized by the following structural formula.

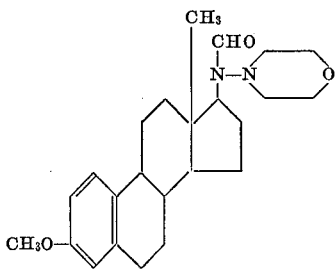

EXAMPLE 7

When an equivalent quantity of N,N-diethylhydrazine is substituted in the procedure of Example 1, there is produced 3-methoxyestra - 1,3,5(10) - trien - 17 - one N,N-diethylhydrazone.

EXAMPLE 8

The substitution of an equivalent quantity of 3-methoxyestra - 1,3,5(10) - trien - 17 - one N,N-diethylhydrazone in the procedure of Example 3 results in N'-(3-methoxyestra 1,3,5(10 - trien - 17β - ylamino)-N,N-diethylamine.

What is claimed is:

1. A member selected from the group consisting of compounds of the formula

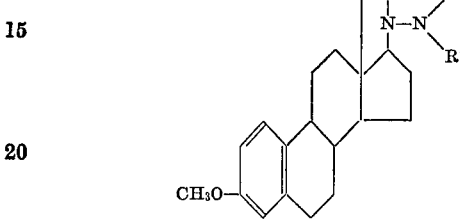

wherein NRR' represents a di-(lower alkyl)amino or 4-morpholino group and R" is hydrogen or a formyl radical and the pharmaceutically acceptable non-toxic salts thereof.

2. As in claim 1, a compound of the formula

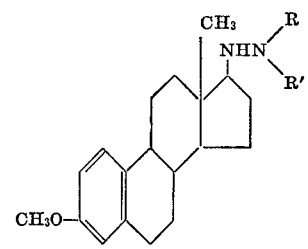

wherein NRR' represents a di-(lower alkyl)amino or 4-morpholino radical.

3. As in claim 1, a compound of the formula

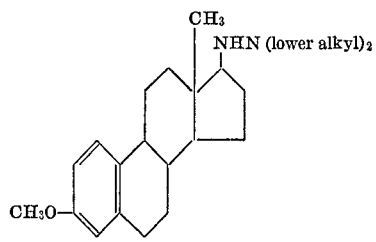

4. A compound according to claim 1, wherein NRR' is 4-morpholino and R" is hydrogen, that compound being 4-(3-methoxyestra - 1,3,5(10) - trien - 17β - ylamino) morpholine.

5. A compound according to claim 1, wherein NRR' is 4-morpholin and R" is formyl, that compound being 4-(N'-formyl - 3 - methoxyestra - 1,3,5(10) - trien - 17β-ylamino)morpholine.

6. A compound according to claim 1, wherein NRR' is dimethylamino and R" is hydrogen and the pharmaceutically acceptable non-toxic salt is oxalate, that compound being N'-(3-methoxyestra - 1,3,5(10) - trien-17β-ylamino)-N,N-dimethylamine oxalate.

7. A compound according to claim 1 wherein NRR' is 4-morpholino and R'' is formyl, that compound being N'-formyl-N'-(3-methoxyestra - 1,3,5(10) - trien-17β-ylamino)-N,N-dimethylamine.

8. A compound according to claim 1, wherein NRR' is dimethylamino and R'' is hydrogen, that compound being N' - (3 - methoxyestra - 1,3,5(10) - trien - 17β-ylamino)-N,N-dimethylamine.

9. 4-(3-methoxyestra - 1,3,5(10) - trien - 17 - imino) morpholine.

References Cited
UNITED STATES PATENTS 3,040,068   6/1962   Chuman et al. _____ 260—397.5
3,284,475   11/1966  Klimstra _____ 260—397.4

HENRY A. FRENCH, Primary Examiner

U.S. Cl. X.R.

260—397.5; 424—238, 241

UNITED STATES PATENT OFFICE
CERTIFICATE OF CORRECTION

Patent No. 3,573,285        Dated March 30, 1971

Inventor(s) Paul D. Klimstra

It is certified that error appears in the above-identified patent and that said Letters Patent are hereby corrected as shown below:

Column 1, line 65, "(10-trion-" should be -- (10)-trien- --.

Column 2, line 33, "correspeond-" should be -- correspond- --.

Column 2, line 41, "produces" should be -- produce --.

Column 2, line 45, delete "ylamine".

Column 2, line 63, "when" should be -- then --.

Column 3, line 36, "Trichmomonads" should be -- Trichomonads --.

Column 3, line 70, "stirpped" should be -- stripped --.

Column 4, line 44, "(3methoxyestra-" should be -- (3-methoxyestra- --.

Column 6, line 68 "4-morpholin" should be -- 4-morpholino --.

Column 7, line 2, "4-morpholine" should be -- dimethylamino --.

Signed and sealed this 24th day of August 1971.

(SEAL)
Attest:

EDWARD M. FLETCHER, JR.        WILLIAM E. SCHUYLER, JR.
Attesting Officer             Commissioner of Patents